(12) United States Patent
Kai

(10) Patent No.: US 12,321,745 B2
(45) Date of Patent: Jun. 3, 2025

(54) PROCESSOR INCLUDING A STREAM INTERFACE AND SYSTEM

(71) Applicant: KOSUMI LLC, Tokyo (JP)

(72) Inventor: Naoyuki Kai, Tokyo (JP)

(73) Assignee: KOSUMI LLC, Tokyo (JP)

( * ) Notice: Subject to any disclaimer, the term of this patent is extended or adjusted under 35 U.S.C. 154(b) by 0 days.

(21) Appl. No.: 18/688,153

(22) PCT Filed: Nov. 9, 2022

(86) PCT No.: PCT/JP2022/041711
§ 371 (c)(1),
(2) Date: Feb. 29, 2024

(87) PCT Pub. No.: WO2023/085317
PCT Pub. Date: May 19, 2023

(65) Prior Publication Data
US 2024/0264833 A1    Aug. 8, 2024

(30) Foreign Application Priority Data
Nov. 12, 2021    (JP) .................................. 2021-196525

(51) Int. Cl.
*G06F 9/30* (2018.01)
(52) U.S. Cl.
CPC ................................ *G06F 9/30043* (2013.01)
(58) Field of Classification Search
CPC ... G06F 9/30043; G06F 9/30134; G06F 9/345
See application file for complete search history.

(56) References Cited

U.S. PATENT DOCUMENTS

| | | | | |
|---|---|---|---|---|
| 6,523,060 B1 * | 2/2003 | Kao | ........................... | G06F 5/06 |
| | | | | 370/413 |
| 6,782,470 B1 * | 8/2004 | Berg | ................... | G06F 9/30098 |
| | | | | 712/E9.046 |

(Continued)

FOREIGN PATENT DOCUMENTS

| | | |
|---|---|---|
| JP | 2009-134391 A | 6/2009 |
| JP | 2018-533120 A | 11/2018 |
| WO | WO-9631820 A1 * | 10/1996 ............... G06F 5/06 |

OTHER PUBLICATIONS

International Search Report dated Feb. 14, 2023 in International Application No. PCT/JP2022/041711.
(Continued)

*Primary Examiner* — Farley Abad
(74) *Attorney, Agent, or Firm* — SALIWANCHIK, LLOYD & EISENSCHENK

(57) ABSTRACT

It is desirable to process a header by a processor for flexible processing in a stream data processing device. However, in the processing by the processor, load/store overhead increases and causes a problem in performance.
Stream data is directly written to or read out from a large size data queue, a part of which is mapped to a region (window) of a general-purpose register of the processor. Imposing constraints on update of a pointer of the queue makes it possible to ensure that a large-small relationship between pointers can be constantly correctly evaluated, and thus to maintain the consistency between write to and read from the queue and the processor processing. A region, which is the same as the data queue, has a control flag queue mapped to a control and status register space of the processor, and the processor gives this control flag, so that an output from the queue is finely controlled without copying the data.

7 Claims, 14 Drawing Sheets

(56) References Cited

U.S. PATENT DOCUMENTS

| | | | |
|---|---|---|---|
| 7,380,106 B1* | 5/2008 | Bilski | G06F 9/3004 |
| | | | 712/225 |
| 7,383,424 B1* | 6/2008 | Olgiati | G06F 15/16 |
| | | | 712/228 |
| 2009/0144527 A1 | 6/2009 | Nakata et al. | |
| 2011/0219286 A1* | 9/2011 | Kamiya | H03M 13/6566 |
| | | | 714/763 |

OTHER PUBLICATIONS

SPARC International, Inc., "The SPARC Architecture Manual," 1994, 9:1-399, Prentice-Hall, Inc.
Notice of Allowance dated Jun. 20, 2023 in Japanese Application No. 2023-521713.
Supplementary European Search Report dated Nov. 7, 2024 in European Application No. 22892815.6.

* cited by examiner

PROCESSOR INCLUDING A STREAM INTERFACE AND SYSTEM

CROSS-REFERENCE TO RELATED APPLICATIONS

This application is the U.S. national stage application of International Patent Application No. PCT/JP2022/041711, filed Nov. 9, 2022, which claims the benefit under 35 U.S.C. § 119 of Japanese Application No. 2021-196525, filed Nov. 12, 2021, the disclosures of each of which are incorporated herein by reference in their entirety.

TECHNICAL FIELD

The present invention relates to a processor that includes a stream interface and is suitable for stream data processing.

BACKGROUND ART

For data transfer between modules in semiconductor chips, typically, there are bus transfer using an address and data, and stream transfer in which modules are connected to each other on a one-to-one basis to transmit data stream. An inter-module interface that performs the stream transfer is referred to as a stream interface. Data to be transferred has a packet structure as shown in FIG. 1 in many cases, and includes a header (1) and a payload (2). There are packet formats in which the boundary of a packet can be recognized from a specific bit pattern, but in many cases, a mechanism that recognizes the first word (3) and the last word (4) of a packet is provided.

Many packet formats are determined according to various official standards or industrial standards. It is desirable to implement packet formats by software processing performed by a processor from the following various reasons.
- In the case of developing semiconductor chips in parallel with formulation of a standard, the standard is not finalized.
- It is necessary to cope with frequent updates of the standard.
- A standard has many options and parameters, and it is difficult to determine the subset to support of the full range of the standard in the chip development stage.
- Software processing by a processor makes it possible to support a plurality of standards by changing programs in the same chip.
- It is possible to experimentally define and evaluate a unique packet format.

If a processor is used in conventional header interpretation processing, the structure shown in FIG. 2 is typically employed. Input data (5) from an input stream interface is taken in an input buffer (7) by an input direct memory access (DMA) (6). The input buffer is mapped to a memory space of the processor (8) and can be accessed by a load/store instruction of the processor (8) via a data bus (9). The stream data subjected to modification such as removal of the header or addition of a new header by the processor (8) is stored in an output buffer (10) that is also mapped to the memory space. The stream data is then read out from the output buffer by an output DMA (11) and output as an output stream (13).

This configuration allows programmable processing by software processing, whereas it involves execution of many load/store instructions, thus increasing the number of program steps and making it difficult to obtain adequate throughput. Further, buffer transfer is required, and thus the latency is increased.

Another related art associated with the present invention is a register window mechanism that is used in some processors. Of those, the architecture of a register window of a SPARC (registered trademark) processor is the most well-known (Non-Patent Literature 1).

As shown in FIG. 3, the register window architecture has a large size register file, and a window that is a part thereof is regarded as a general-purpose register by the processor at some point in time. It is well known that shifting a window position makes it possible to conceal the time required for processing the stack of the processor at the time of a procedure call.

However, since the size of the register file is finite, it is necessary to perform write to the memory when the register file is exhausted after repeated procedure calls, and to perform read from the memory when the register file is empty after repeated returns from procedures. For this processing, intervention of software is required, and the original operation of the program is temporarily stopped.

Furthermore, the register window architecture is for improving the performance of processing the stack for procedure call and return, and stream data processing is not available.

CITATION LIST

Non-Patent Literature

Non-Patent Literature 1: The SPARC Architecture Manual, Version 9 (SPARC International Inc.) Section 5.1 "Non-privileged Registers"

DISCLOSURE OF INVENTION

Technical Problem

It is an object of the present invention to allow programmable stream data processing by using a processor and to achieve high-performance stream data processing by eliminating load/store overhead of stream data.

Solution to Problem

A processor according to one embodiment of the present invention is a processor including a stream interface that processes one or a plurality of data queues, in which each of the data queues includes a mechanism that directly writes stream data from an input interface and a mechanism that directly reads out the stream data to an output interface, a partial region of the data queue is mapped to general-purpose registers of the processor, and the processor executes a program to access the partial region of the data queue mapped to the general-purpose registers.

Advantageous Effects of Invention

According to the present invention, it is possible to allow programmable stream data processing by using a processor and to achieve high-performance stream data processing by eliminating load/store overhead of stream data.

MODE(S) FOR CARRYING OUT THE INVENTION

Figure 1:
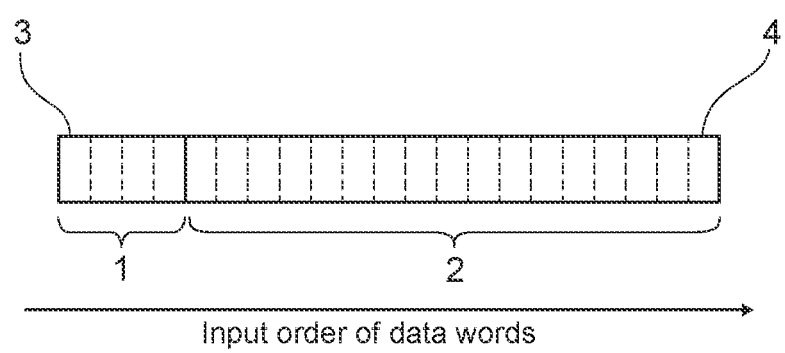
FIG. 1 is a diagram for describing a packet structure of stream data.
Figure 2:
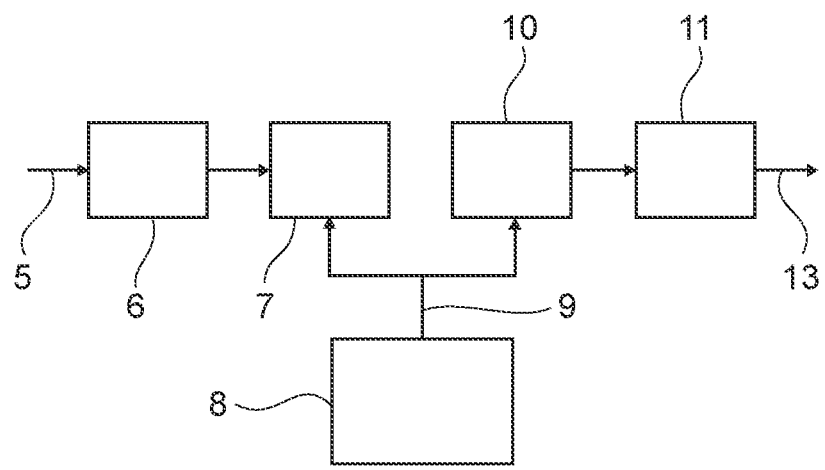
FIG. 2 is a diagram for describing a conventional structure of a stream data processing device using a processor.
Figure 3:
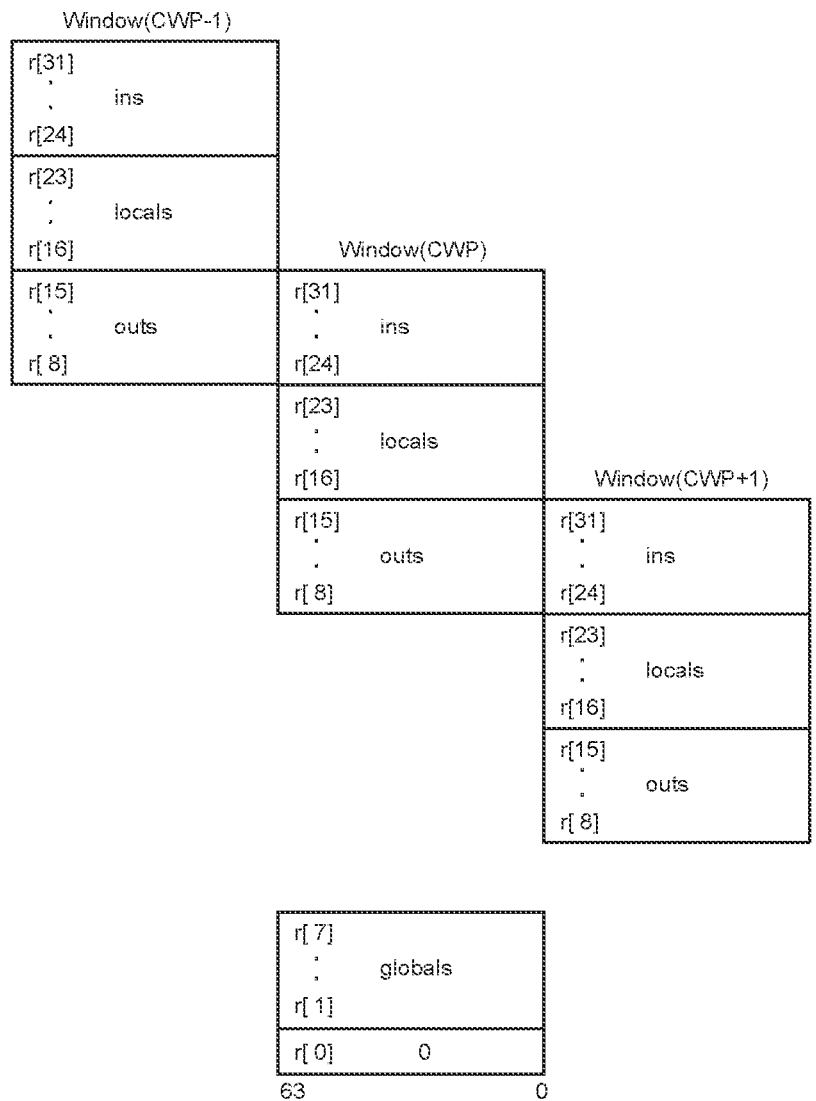
FIG. 3 is a diagram for describing a register window of SPARC.

According to one embodiment of the present invention, it is intended to allow programmable stream data processing by using a processor and to achieve high-performance stream data processing by eliminating load/store overhead of stream data.

According to one embodiment of the present invention, a large size data queue and a window that is a region of the queue accessible as general purpose registers are provided. If a window base pointer is set, it can be moved in the queue.

Input stream data is directly written to a queue by an input control unit. The queue data is mapped to a general-purpose register of the processor and can be accessed as a general-purpose register from the processor later, and thus the load/store overhead is concealed.

Having a plurality of pointers for accessing the queue and imposing constraints on the update of the pointers and the like makes it possible to constantly correctly evaluate a large-small relationship despite a finite bit length, and on the basis of this, the consistency of the input to the queue, the output, and the access from the processor is taken.

A control flag queue is provided, and a region of which that is corresponding to the window of the data queue can be accessed as control/status registers (CSR) by the processor. The output from the data queue is controlled by the control flag in the control flag queue set by the processor beforehand, and thus copying of data is minimized in reconfiguration of output packets.

According to one embodiment of the present invention, the load/store overhead is concealed while ensuring the flexibility of the software processing by the processor, and copying of data is not performed in reconfiguration of output packets, so that high-performance stream data processing can be achieved.

One embodiment of the present invention will be described in more detail. Each word of an input data stream is given an index of a conceptually infinite bit length that is initialized to 0 and then monotonically increases according to the input. (The increment at the time of increase is usually 1. Sometimes it is not the case as shown below, but unless otherwise stated, the case where the increment is 1 will be described below.)

An index and a pointer of a queue will be described with reference to FIG. 5.

A write pointer (wp) (20) is an index of a word of a stream that is to be written to the queue next by the input control unit, and a read pointer (rp) (21) is an index of a word of a stream that is to be read from the queue next by an output control unit.

A window base pointer (wbp) (22) is the first index of a region that is mapped to a window of general-purpose registers.

Assuming that the size of the window is wsize, indices of wbp, wbp+1, wbp+2, ..., and wbp+wsize−1 are mapped to the general-purpose register.

For example, assuming that the processor includes 32 general-purpose registers x0, x1, ..., and x31 and four registers x28 to x31 are windows, the wsize is 4. When the processor accesses the general-purpose registers x28, x29, x30, and x31 by an instruction, the processor accesses the words of indices wbp, wbp+1, wbp+2, and wbp+3 of the queue.

The physical size of the queue is assumed as qsize.

Figure 5:
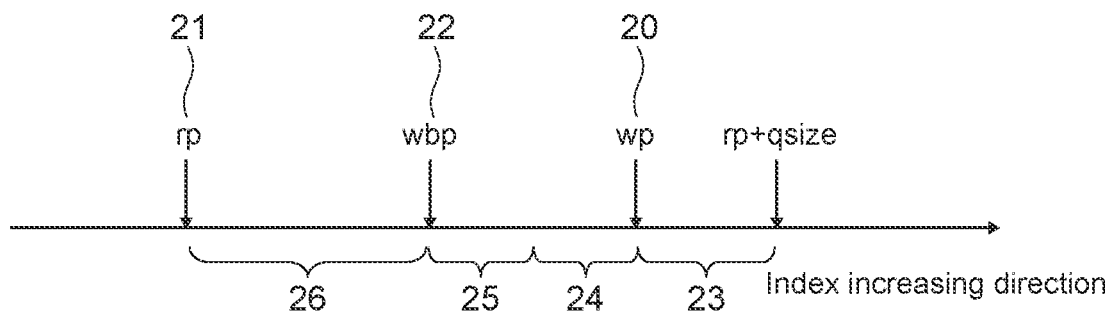
FIG. 5 is a diagram for describing an index and a pointer of a queue.

In FIG. 5, the portion from rp to rp+qsize is a portion corresponding to the latest state of the queue, and includes four regions:

a region of invalid data (having been read and being rewritable) (23);

a region not yet processed by the processor (24);

a region being processed by the processor (25); and a region already processed by the processor (26).

In other words, those pointers satisfy the following conditions.

Condition 1: rp<=wbp

Condition 2: rp<=wp

Condition 3: wp<=rp+qsize

Figure 6:
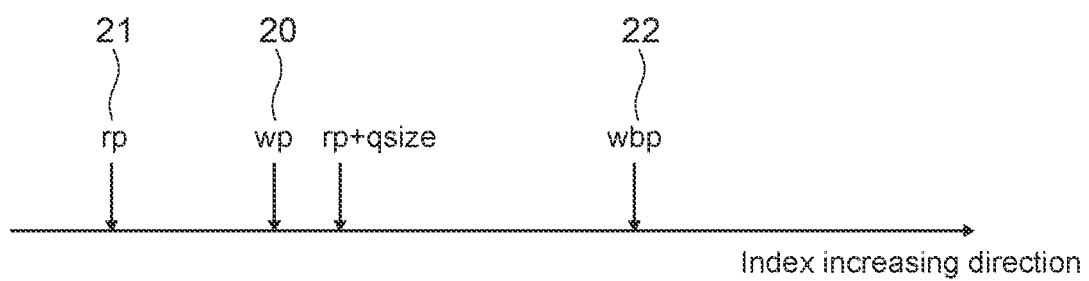
FIG. 6 is a diagram for describing a case where the value of a window base pointer is larger than the value of a write pointer.

As shown in FIG. 6, the window base pointer (22) may be larger than the write pointer (20). In this case, when the processor accesses a register in the window, the processor stalls and waits until the data is written to the queue and the write pointer wp (20) exceeds the index corresponding to the accessed register.

Each pointer (20, 21, 22) conceptually has an infinite bit length, but it holds only a finite bit length (n bits) of the lower-order part as an entity. In addition, of those, the lower-order m bits become the address of the entry of the queue.

Imposing certain constraints on the update of the values of the pointers wp, rp, wbp (20, 21, 22) which have finite bit length makes it possible to perform always correctly large-small comparison among the values of pointers of the original conceptually infinite bit lengths. This will be shown below.

Condition 4: If the absolute value of the difference between two unsigned numbers a and b is less than 1<<(n−1) ((n−1)th power of 2), a large-small comparison can be performed as follows by using only the lower-order n bits thereof.

If (a[n-1] ^ b[n-1]) && (a[n-2:0] > b[n-2:0]) is 1, a > b.
If (a[n-1] ^ b[n-1]) && (a[n-2:0] < b[n-2:0]) is 1, a <b.
If (a[n-1] == b[n-1]) && (a[n-2:0] == b[n-2:0]) is 1, a == b.
Since the difference between a and b is less than 2^(n-1)
((n-1)th power of 2),
(a[n-1] ^ b[n-1]) && (a[n-2:0] == b[n-2:0]) is not 1.

Here, the Verilog notation is used, in which a[i] represents a bit i of a, a[j:k] represents bits j to k of a, ^ represents XOR, && represents logical AND, > represents a large-small comparison between unsigned numbers, and << represents a left bit shift.

In each of wp, rp, and wbp, the change in value of the original conceptual pointer having an infinite bit length is an increase only, and does not decrease.

Since wp and rp change while satisfying the conditions 1 and 3, the absolute value of the difference between wp and rp is equal to or less than the m-th power of 2. Therefore, if n>=m+2, the condition 4 is automatically satisfied.

There are possible various methods of constraining the absolute values of the difference between wbp and wp and between wbp and rp, but the following method is taken as an example.

If rp<=wbp<=wp, the increment of the change in wbp is assumed to be equal to or less than 1<<(n−2) ((n−2)th power of 2). Thus, the difference between wbp and rp after updated is less than 1<<(n−1).

Since the window size is smaller than the queue size, not only wbp but also the difference between the largest index in the window and wp are less than 1<<(n−1).

If wbp>wp, wbp is not changed.

After wp, rp, and wbp are initialized to 0, wp, rp, and wbp are updated so as to satisfy the constraint conditions described above, so that the state capable of performing a large-small comparison between those pointers wp, rp, and wbp can be constantly maintained.

On the basis of the large-small comparison, the access to each entry of the queue from each of the input control unit, the output control unit, and the processor, and the update of the pointers are controlled.

If the size of the queue is not a power of 2, the indices of the queue may change discontinuously at a certain location, but it does not affect the discussion of the possibility of the large-small comparison, and the large-small comparison is likewise possible.

Figure 4:
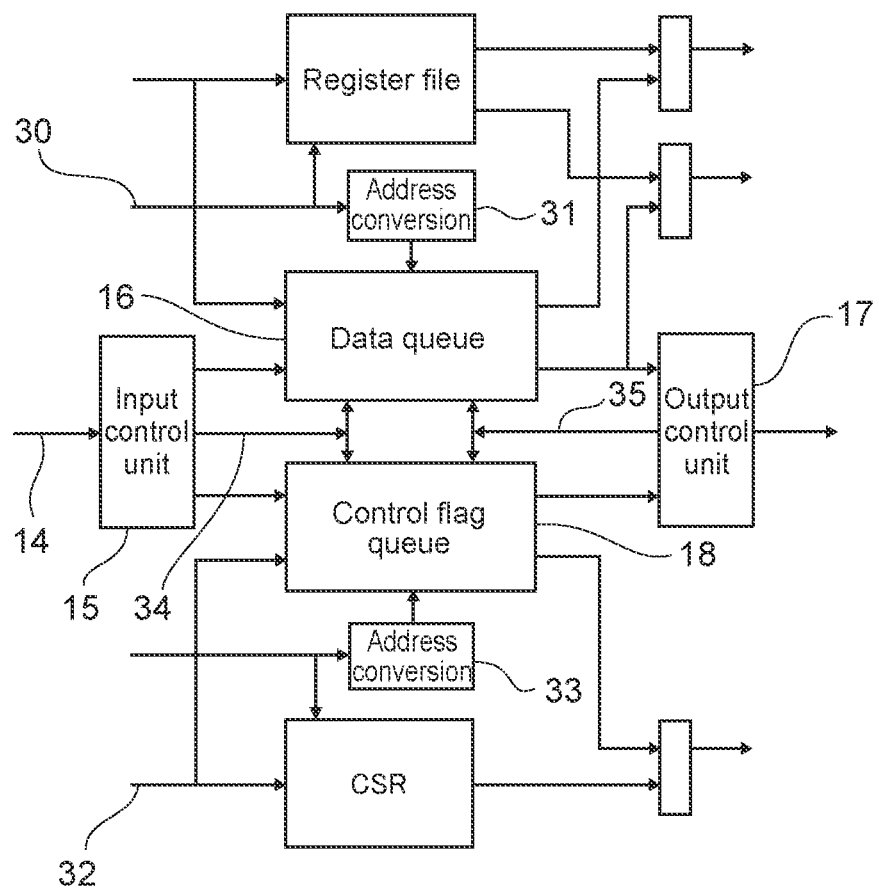
FIG. 4 is a diagram for describing a mechanism that accesses a data queue and a control flag queue of the present invention.

With reference to FIG. 4, the access to a data queue (16) and a control flag queue (18) in a representative example will be described. The processor processes a control flag queue (18) having an entry corresponding one-to-one to the entry of the data queue (16). The control flag queue (18) is accessed (34) from the input control unit (15) simultaneously with the data queue (16) using the same index as that of the data queue (16). The control flag queue (18) is accessed (35) from the output control unit (17) simultaneously with the data queue (16) using the same index as that of the data queue (16). In other words, the control flag queue (18) is indexed similarly to the data queue (16), and an index range identical to that of the data queue (16) is mapped to a control and status register space of the processor. Many processors include, in addition to the general-purpose register, a control and status register (CSR) that is accessed in response to a dedicated instruction for the purpose of controlling the operation of the processor.

For example, RISC-V includes a CSR space that is accessed by an index of 12 bits. Many other processors can also include a register group corresponding thereto. In a control flag window, a region having the same index region as that of a queue window is defined as a flag window, and this is mapped to the control and status register (CSR) space. When the processor accesses this CSR region, the processor will access a control flag window in the control flag queue (18). The control flag is usually shorter than the word length of the processor, and the word length of the CSR is usually the same as the word length of the processor. Thus, when it is accessed as a CSR, it will be embedded in one word length of the processor.

When a general-purpose register is accessed from the processor, a register address (30) is given, but if this register address (30) is in a queue window, it is converted into an address of the data queue (16) by an address conversion module (31) to access the data queue (16).

When the processor accesses the CSR, an address (32) of the CSR is given, but if this address (32) of the CSR is in the range of the control flag window, it is converted into the address of the control flag queue (18) by another address conversion module (33) to access the control flag.

The input control unit (15) simultaneously performs write to the data queue (16) and the control flag queue (18) using the same address.

The output control unit (17) simultaneously performs read from the data queue (16) and the control flag queue (18) using the same address.

The purpose of the control flag is to control the operation of a subsequent stage, that is, the processor for the input control unit (15), and the output control unit (17) for the processor.

An implementation example of the bit configuration of the control flag will be described below. The control bit includes those for the purpose of supporting a modified example of the present invention to be described later. The number of bits and encoding in this configuration are merely examples and are not intended to limit the scope of the present patent. Further, the following control functions are also examples, and it is not necessary to implement all of the functions described herein, and only a part of them may be implemented. A control function can also be added to correspond to the function of the output control unit (17).

In this example, the control flag includes 8 bits, in which each bit of 2 bits has its own meaning and the remaining 6 bits are encoded.

Bit 7 sop (start of packet)
Bit 6 eop (end of packet)

Those two bits are set as packet boundary information of an input stream from the input control unit (15). When the processor reformats packets, those bits are overwritten by the processor.

In bit 5:0, 0 is written from the input control unit (15), and the value is set by the processor. This bit is encoded as follows.

00nnnn repeat

The output control unit (17) is instructed to output data of the current index repeatedly by nnnn+1 times. After all the repeated outputs are done, a read pointer p is incremented.

If nnnn=0, the output is performed one time as usual.

01nnnn skip

The output control unit (17) is instructed not to output nnnn+1 words starting from the current index. The read pointer is incremented by (nnnn+1).

100000 link

Data in the data queue (16) is not output as data, and is taken in the read pointer as an address of the next queue.

100001 eol (end of link)

It is used when a linked list is configured (to be described later). It is a place where a link should be written to the control queue, but if the address of a link destination to be written to a word corresponding to the data queue is not yet determined, the processor writes it instead of the link. If the read control flag is eol, the output control unit (17) disables the read data, stops reading, and does not update rp.

100010 call

It is used in a main queue if two queues are configured as main/sub-queues. The data in the data queue (16) is used as an index of the sub-queue, and the sub-queue is read consecutively up to the data that is set with eop. After the data set with eop is read, it returns to the main queue and increments rp.

1100mm opsel

If a control unit that performs output to a plurality of output interfaces is provided (to be described later), the output interface is selected by mm. This is meaningful only when the sop bit is 1, and this is ignored when the sop bit is 0.

A configuration including a plurality of output interfaces will be described as a modified example of the present invention.

Output from one queue to a plurality of output interfaces involves two methods. For description, a simple example is conceivable, in which a port of an output destination is selected on the basis of the contents of the header of an input packet, and only the payload is output to the port of the output destination.

A first method is a method of sorting read data by using opsel of the control flag.

When the processor processes packet data in the queue, if a sop flag is set in the output data of the packet, the output control unit (17) refers to the opsel and outputs the packet data to the output interface specified by the parameter of mm of the opsel.

This association is valid up to the top of the next packet (data that is set with sop).

In this method, read is performed for both ports by using a common read pointer.

Figure 7:
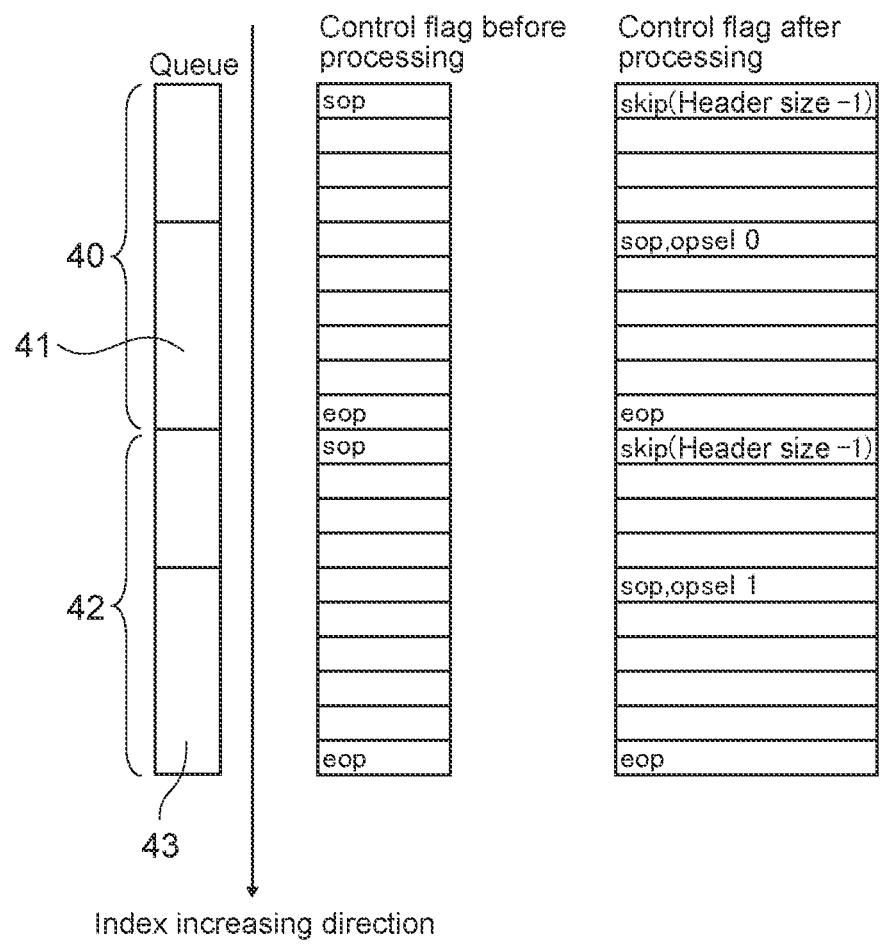
FIG. 7 is a diagram for describing output to two output interfaces.

In the example of FIG. 7, a payload (41) of a first packet (40) is output to the port 0, and a payload (43) of the next packet (42) is output to the port 1.

As shown in FIG. 7, in a control flag queue not yet processed, a sop flag is set in the first word of the header, and an eop flag is set in the last word of the payload.

Meanwhile, in a control flag queue already processed by the processor, skip nnnn (nnnn=header size−1) is given as a control flag of the first word of the header.

In a control flag of the first word of the payload, sop is set and opsel mm is also given. Here, mm is an output interface number determined from the contents of the header.

At the time of output, the header is skipped, and only the payload is transmitted to the output interface mm. This is repeated for each packet.

A second method is a method using linked lists. In this method the processor configures linked lists each corresponding to an output interface from an input stream. If the control flag has a specific value (link) the data is treated as link that is the address of the data to read out next. The processor utilizes this mechanism to configure multiple linked lists in the queue, thus distributes to each output interface.

In this method, a corresponding read pointer is provided for each output interface. In the example shown in FIG. 8, two output interfaces are assumed, and two read pointers rp0 and rp1 are provided.

The large-small comparison is also possible between the plurality of read pointers rp0 and rp1, which is easily understood from the above description.

If there are a plurality of read pointers, the smallest pointer min_rp among them can be obtained, and the condition 3 for wp is changed as follows.

Condition 3': wp<=min_rp+qsize

If a linked list is configured, each read pointer has a valid flag indicating that a value is set for the read pointer. The initial value of the valid flag is 0 (invalid).

Figure 8:
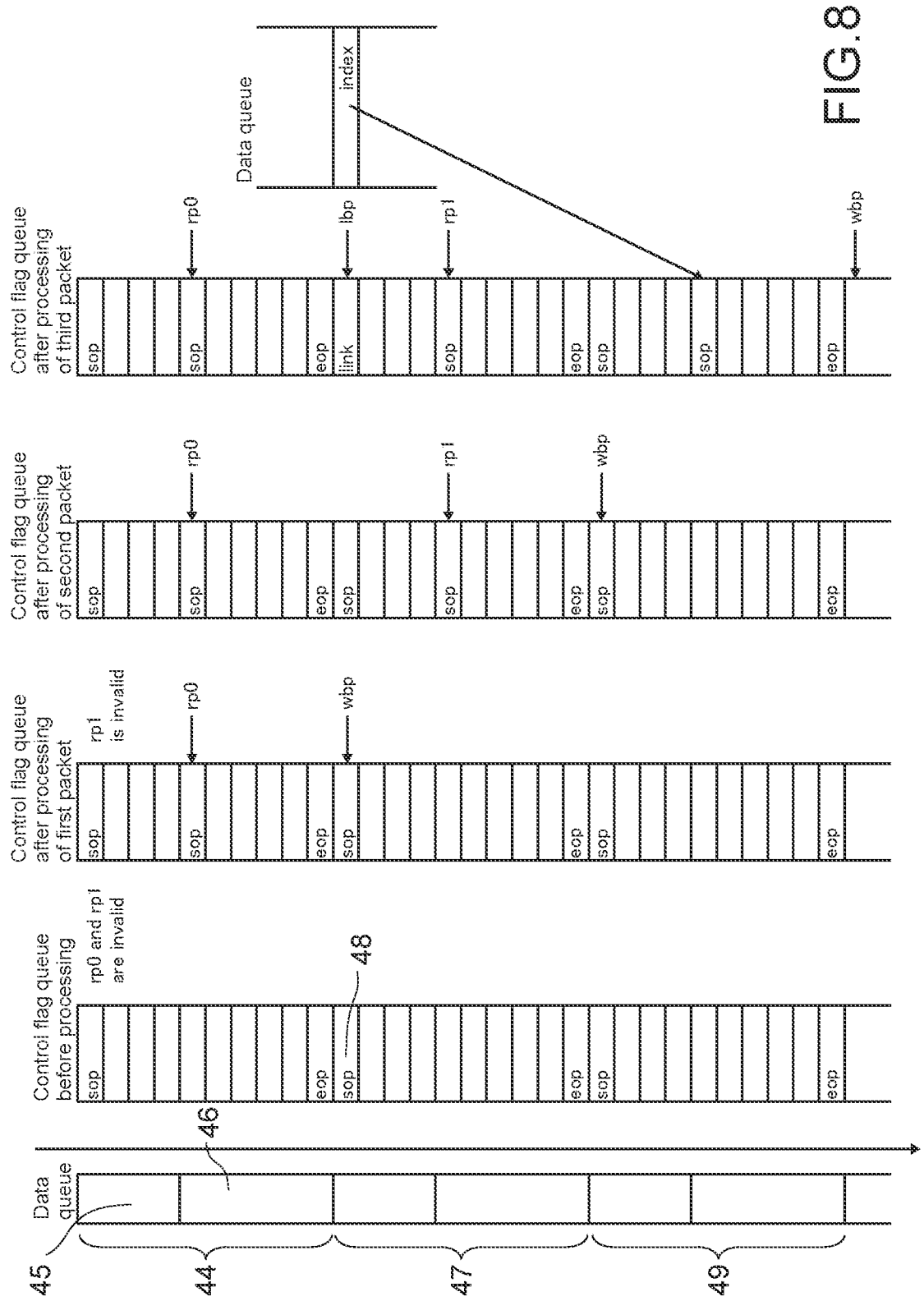
FIG. 8 is a diagram for describing output to a plurality of output interfaces using linked lists.

As shown in FIG. 8, after processing of a first packet (44) by the processor, the output destination of this packet is determined on the basis of the contents of a header (45) (in this case, port 0), and an index of a first payload (46) is set for rp0.

A second packet (47) is assumed to be output to an output interface 1. A first control flag (48) of the header thereof is used as a link of the previous packet. At the time point of the processing of the second packet, a position of a packet to be output to the next port 0 is not yet determined, and eol (end of link) is set instead of a link.

This setting of eol has to be performed before wbp is increased from this position. This is because read for the port 0 may progress beyond here if wbp is updated (increased) before eol is set.

Assuming that a third packet (49) is a packet to be output to the port 0, an address to be set for a data queue with the above-mentioned link is determined here. Since wbp cannot be used for this write, it is necessary to use another window in which only one word can be accessed exclusively for write of a link address. In other words, the processor accesses one word of the data queue as a special register, separately from the window of the general-purpose register.

A window of only one word can be implemented as follows.

The following three registers are added as CSRs.

| |
| --- |
| lidx link index |
| ldat link data |
| lflg link flag |

A position of a window of one word is set in lidx, and then a ldat register is accessed and a lflg register is accessed in the window of one word in the queue, so that a control flag of the window of one word can be accessed.

A word to which an address of a link destination is written is only a word that is set with eol, and thus read does not precede write.

As another modified example, description will be given on a configuration in which a pair of a main queue and a sub-queue is provided, and a packet from the sub-queue is inserted using a call of the above-mentioned control flag at the time of reading data from the main queue.

Figure 9:
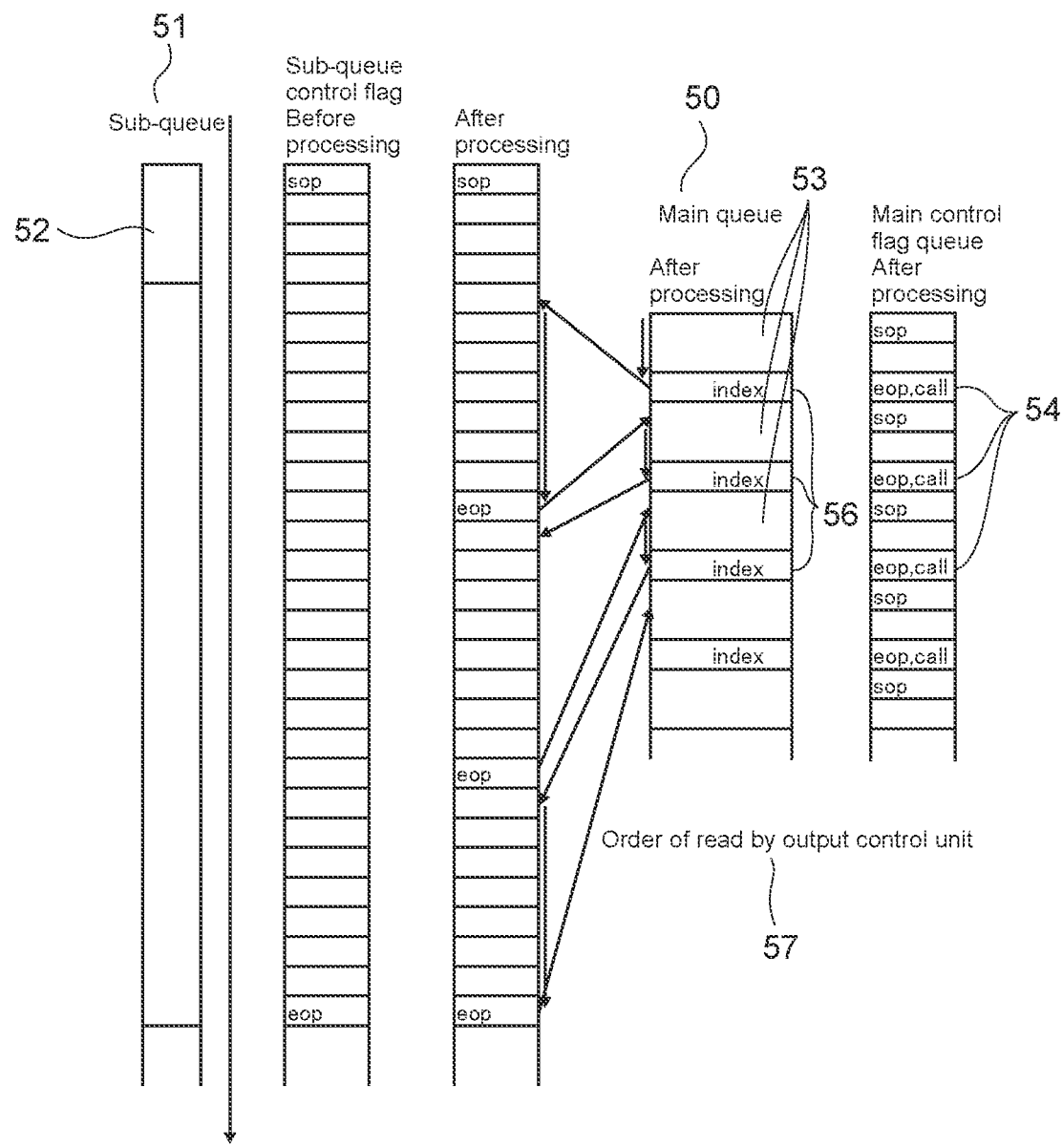
FIG. 9 is a diagram for describing a mechanism of a main/sub-queue.

As shown in FIG. 9, a main queue (50) and a sub-queue (51) are provided.

The main queue has a queue window and a read port and is accessed from the processor and the output control. The sub-queue has a write port and a queue window and is accessed from the input control unit and the processor.

The general-purpose registers to which the queue windows of the main queue and the sub-queue are mapped may be used while switching the ranges having the same register number or may be capable of being accessed at the same time from the processor using the two ranges.

As one example of use, the following case is conceivable: a packet of the input stream is divided into packets having smaller size, new headers are added to the packets, and the packets are output.

FIG. 9 shows a change in contents of the queue before and after the processing by the processor when an input packet is decomposed into a plurality of output packets.

The processor reads a sub-queue (51), analyzes a header (52), creates new headers (53) of divided packets, and writes them in a main data queue.

Further, in order to obtain the payload from the sub-queue, the processor writes call in a position (54) subsequent to the header of a main control flag queue, and writes an index of the sub-queue of the divided payload in the same index position (56) of the main queue.

In addition, the processor writes eop to a sub-queue control flag at the divided position of the sub-queue.

As described above, when the output control unit reads out the main queue, the packets that have been divided and provided with new headers are sequentially output (57).

It is also possible to provide a plurality of input interfaces and a plurality of queues corresponding thereto.

Figure 10:
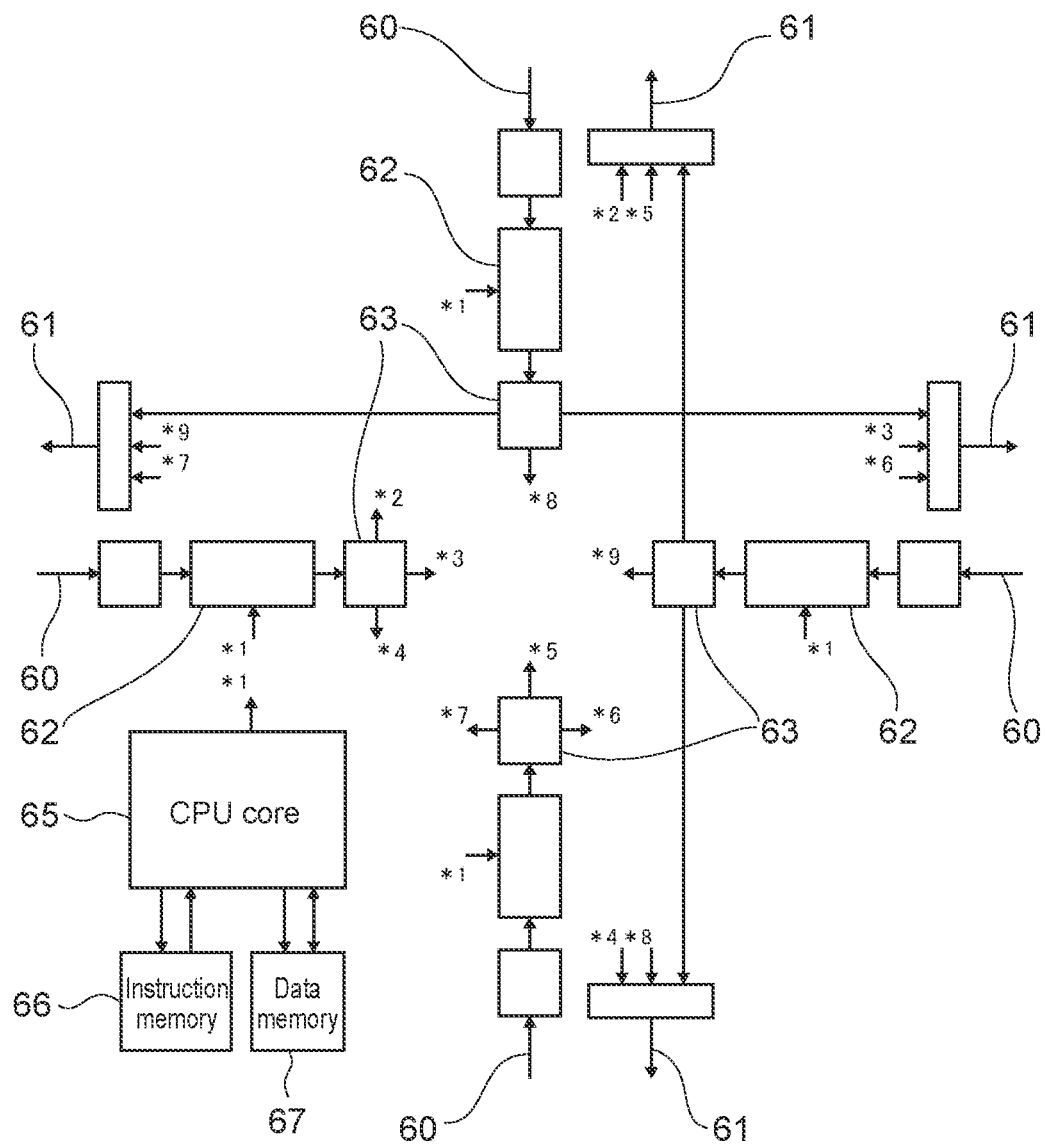
FIG. 10 is a diagram for describing output to four input interfaces, four output interfaces, and a plurality of output interfaces using linked lists.

FIG. 10 is an example of a configuration including four input interfaces (60), four output interfaces (61), and four queues (62).

Four output control units (63) are also provided and are each capable of being connected to three output interfaces. As a mechanism that performs output from one output control unit to a plurality of output interfaces, as described above, an output selection (opsel) may be used with a single read pointer, or the linked lists may be used with a plurality of read pointers.

Each output interface includes an output packet multiplexer (64) for multiplexing the outputs from the plurality of output control units. The output packet multiplexer multiplexes the output streams by arbitration on a packet basis. As the arbitration algorithm, static priorities, round robin, and the like are conceivable.

A CPU core (65) may include one window and select a queue as necessary to map the queue or can include two or more windows and simultaneously map a plurality of queues.

In this configuration, it is assumed that an instruction memory (66) and a data memory (67) are locally provided, and stream interfaces are used for all external access.

Next, the case of a plurality of processing modules and a modified example of inter-processor communication will be described.

Figure 11:
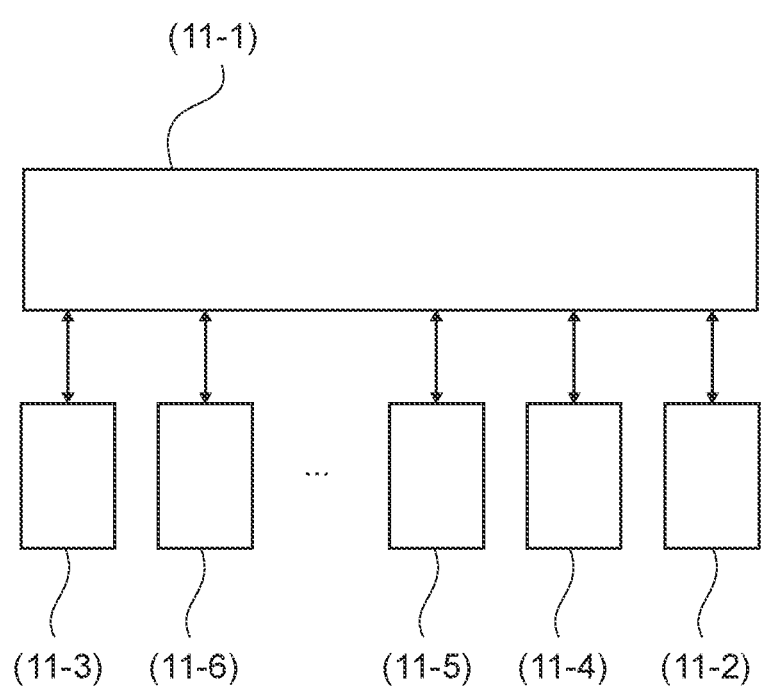
FIG. 11 is a diagram of a configuration in which a plurality of processing modules access a queue.
Figure 12:
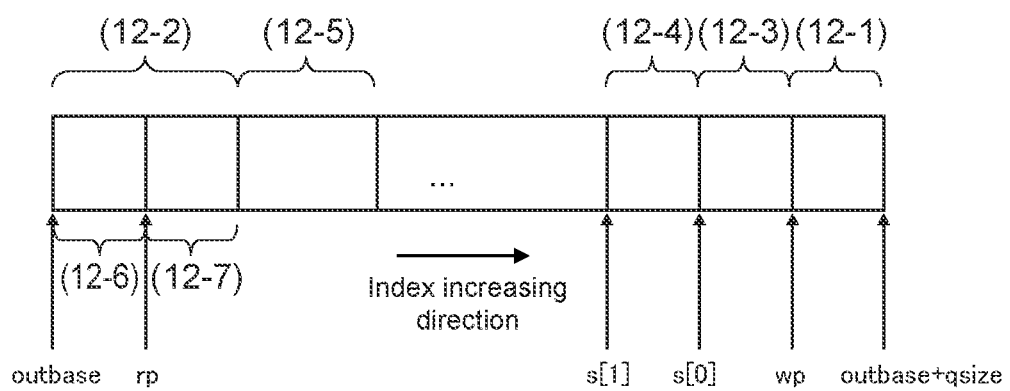
FIG. 12 is a diagram for describing regions of a queue that are accessed by the plurality of processing modules.
Figure 13:
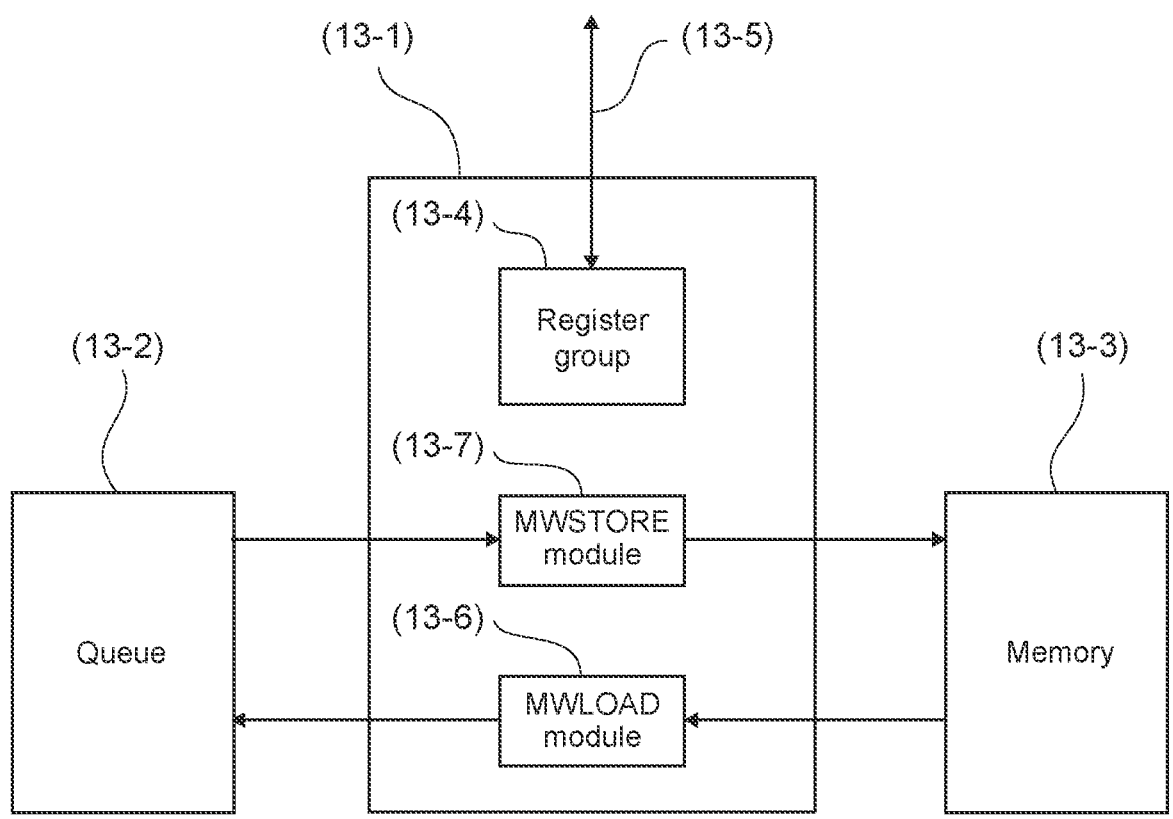
FIG. 13 is a diagram for describing a configuration that implements multi-word load/store.

A modified example in which a plurality of processing modules access the same queue will be described with reference to FIGS. 11 and 12.

An input control unit (11-2), an output control unit (11-3), and n processing modules > M0 (11-4),
> M1(11-5),
> ..., and
> M(n-1) (11-6)
> access a RAM (11-1) of a queue.

The processing module may be a processor or a hardware module. Possible examples of the hardware module include a hardware module that calculates, gives, or checks a CRC of data, but the present invention is not limited thereto.

The data processing by the processing module follows the order of module numbers. In other words, the data input to the queue is processed in the order of M0, M2, . . . , and M(n−1) and output by the output control unit. The input control unit, the output control unit, and each processing module each include a register with a start index of a region of the queue managed by each module and is updated according to the progress of the processing. The update direction is only an increase.

The region of the queue is divided as follows.

Region (12-1) managed by the output control unit. The start position of this region is a write pointer (wp).

Region (12-2) managed by the output control unit. The start position of this region is an outbase register.

The outbase may be the same as a read pointer (rp) or smaller than rp.

Region (12-7) is a region capable of reading for output.

If the outbase is smaller than rp, an output retry region (12-6) is present. If transmission of the output causes a problem, retry transfer can be performed by restoring rp.

The start index of the region managed by a processing module M(i) is held by a register s[i].

> The processing module M0 manages a region of s[0] ... wp-1.
> If i is not 0, a processing module M(j) manages S[j] ... S[j-1]-1.

If the processing module is a processor, the processor can access any position of the region managed by itself by changing wbp and moving the position of the window. A region having an index smaller than that of the region managed by itself cannot be accessed. If it is accessed, an exception occurs. However, a window of one word that is used in the linked list processing is exceptional, and in this case, the region managed by a processing module at a subsequent stage or the output control unit can be accessed. If a region having an index larger than that of the region managed by itself is accessed, wait occurs. The wait continues until the module at the previous stage increases the start index of the region, and its index position enters the region managed by itself.

In a special case of this example, there is a case where only two processors are connected as processing modules without connecting the output control unit and the input control unit. In such a case, the queue provides extremely efficient communication means between two processor cores.

Next, an example of multi-word load/store will be described.

In response to a load or store instruction of the processor, load or store of only one register can be executed.

In this example, the processor includes a multi-word load/store module (13-1) that loads/stores a plurality of words.

The multi-word load/store module includes a CSR register group (13-4) that is read and written via a bus (13-5) that access a CSR register, an MWSTORE module (13-7), and an MWLOAD module (13-6). The MWSTORE module performs transfer from a RAM (13-2) of the queue to a memory (13-3) according to the contents of a control register, and the MWLOAD module performs transfer from the memory to the RAM of the queue.

As a CSR, the following registers are added, and a DMA control unit is provided between a data queue and a memory space, thus allowing DMA transfer.

```
QDMAIDX queue index
QDMAADDR memory address
QDMACTRL having the following bit configuration
31 EN
30 DIR store with 1, load with 0.
7:0 number of transferred words
```

The processing procedure of multi-word store is as follows:

```
change wbp as necessary, and prepare data to be stored in the
  queue;
set values for QDMAIDX and QDMAADDR; and then
set QDMACTRL with EN=1 and DIR=1.
Upon completion of transfer, EN bit of QDMACTRL is cleared.
```

The processing procedure of multi-word load is as follows:

```
set values for QDMAIDX and QDMAADDR; and then
set QDMACTRL with EN=1 and DIR=0.
Upon completion of transfer, EN bit of QDMACTRL is cleared.
```

After activation, the multi-word load/store is executed in parallel with the execution of instructions by the processor.

The access right of the region in the queue is the same as the access from the processor. When the load from the region managed in the previous stage is executed, wait occurs in the transfer processing (which is not a stall of the processor processing).

Next, addition of a queue having an alignment function will be described.

If stream data is 4-byte aligned but a data width of the processor is 64 bits, alignment is not obtained. Further, there is a case where stream data is byte-aligned, and the top of a packet or the top of a payload is not aligned with a register boundary.

Figure 14:
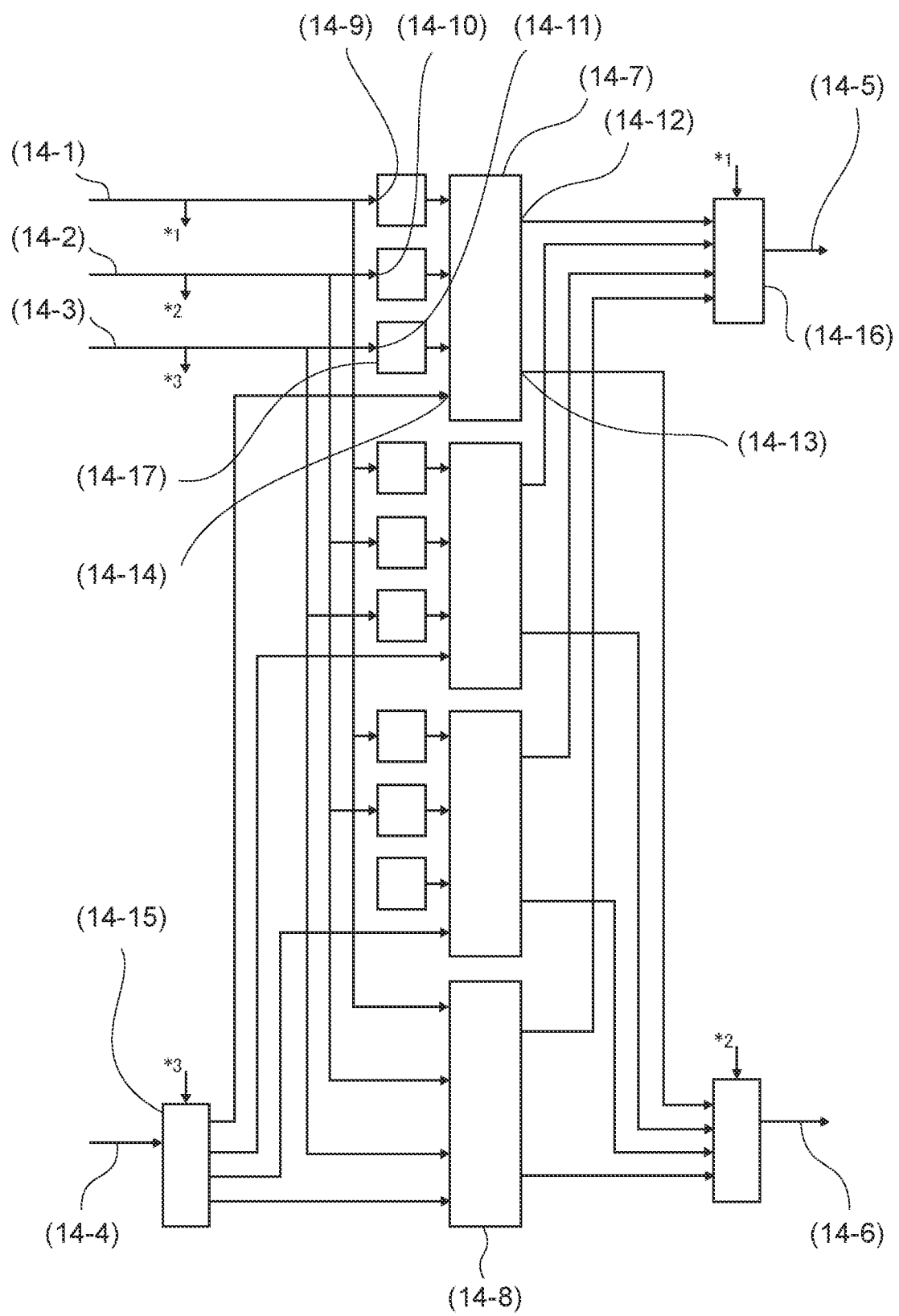
FIG. 14 is a diagram for describing a configuration of a queue that can access a word from any byte position.

In such a case, it is usually necessary to obtain alignment by shift processing of software, in which the processing is complicated, and the processing performance is also deteriorated. In the following example, the window base pointer is provided in bytes rather than in units of register width, thus allowing a register to be accessed from any position in the stream. In other words, the processor performs a byte shift when the processor maps a partial region of the data queue to the general-purpose register of the processor, and accesses a word from any byte position of a data stream of the data queue as a general-purpose register. This configuration will be described with reference to FIG. 14.

The configuration includes
an address port (14-1) and a read data port (14-5) for a first read port,
an address port (14-2) and a read data port (14-6) for a second read port, and
an address port (14-3) and a write data port (14-4) for a write port.

The RAM in the queue is divided for each byte lane. This figure describes an example of 32 bits, and it is divided into four RAMs from a RAM (14-7) of a byte lane 0 to a RAM (14-8) of a byte lane 3. The RAM of each byte lane includes
an address port (14-9) and a read data port (14-12) for the first read port,
an address port (14-10) and a read data port (14-13) for the second read port, and
an address port (14-11) and a write data port (14-12) for the write port.

The write data (14-4) is connected to the write port of the RAM of each byte lane via a shifter in bytes (14-15). Further, read data of the first and second read ports are output to the read data ports via a shifter in bytes (14-16). A shift amount of each shifter is determined by the lower-order 2 bits of the address, which indicate a byte position in the word.

An address to each RAM is obtained by an address converter (14-17) on the basis of the address and the byte lane position as follows.

For each port, a higher-order bit of the address is assumed to be obtained by excluding the lower-order bits from the address.

Byte Lane 0

If the lower-order 2 bits of the address are not 0, it is a higher-order bit+1 of the address in words.

Otherwise, it is a higher-order bit of the address.

Byte Lane 1

If the lower-order 2 bits of the address are 10 or 11, it is a higher-order bit+1 of the address in words.

Otherwise, it is a higher-order bit of the address.

Byte Lane 2

If the lower-order 2 bits of the address are 11, it is a higher-order bit+1 of the address in words.

Otherwise, it is a higher-order bit of the address.

Byte Lane 3

It is always a higher-order bit of the address.

The invention claimed is:

1. A processor, comprising:
a stream interface that processes one or a plurality of data queues, wherein
each of the data queues includes a mechanism that directly writes stream data from an input interface and a mechanism that directly reads out the stream data to an output interface,
a window of consecutive multiple words of the data queue is mapped to general-purpose registers of the processor,
the processor executes a program to access said window of consecutive multiple words of the data queue mapped to the general-purpose registers, and
the stream data written from the input interface are modified by the processor by accessing said window before outputting to the output interface.

2. The processor according to claim 1, wherein
an index of an infinite bit length that monotonically increases is given to an input data stream of the data queue,
the data queue includes a plurality of pointers including
a write pointer that is an index of a word of a stream to be written next in the data queue by an input control unit of the processor,
a read pointer that is an index of a word of a stream to be read out next from the data queue by an output control unit of the processor, and
a window base pointer that is a first index of a region mapped to a window of the general-purpose register,
the plurality of pointers each hold a finite bit length (n bits) of a lower-order part of the index of the infinite bit length, and
the processor imposes a certain constraint condition on update of values of the plurality of pointers to evaluate a large-small relationship between indices each having an original infinite bit length, the indices corresponding to the plurality of pointers.

3. The processor according to claim 2, wherein the processor processes a control flag queue that holds a control flag, the control flag queue is indexed similarly to the data queue, and an index range identical to an index range of the data queue is mapped to a control and status register space of the processor, and the processor executes a program to access a control status register mapped to the control and status register space, write a value, and control output from the data queue.

4. The processor according to claim 3, wherein the processor configures linked lists in which if a value of the control flag is a special value meaning a link the data is the address of data to read next and output module should update the read pointer by that value, and the processor generates a plurality of linked lists each corresponds to an output interface to distribute streams.

5. The processor according to claim 4, wherein the processor accesses one word of the data queue as a special register, separately from said window of consecutive multiple words of the data queue mapped to the general-purpose registers.

6. The processor according to claim 1, wherein the processor performs a byte shift when the processor maps a window of the data queue to the general-purpose register of the processor, and the processor accesses a word from any byte position of a data stream of the data queue as the general-purpose register.

7. The processor according to claim 2, wherein the constraint condition is to satisfy that an absolute value of a difference between two unsigned numbers a and b is less than $1<<(n-1)$ ((n−1)th power of 2), and the processor determines, using a finite bit length (n bits) of the lower-order part, that if (a[n-1] ^ b[n-1]) && (a[n-2:0] > b[n-2:0]) is 1, a > b,
if (a[n-1] ^ b[n-1]) && (a[n-2:0] < b[n-2:0]) is 1, a < b, and
if (a[n-1] == b[n-1]) && (a[n-2:0] == b[n-2:0]) is 1, a == b, to evaluate the large-small relationship between the indices each having the original infinite bit length, the indices corresponding to the plurality of pointers, where a[i] represents a bit i of a, a[j:k] represents bits j to k of a, ^ represents XOR, && represents logical AND, > represents a large-small comparison between unsigned numbers, and << represents a left bit shift.

* * * * *